US011993836B2

(12) United States Patent
Lan et al.

(10) Patent No.: US 11,993,836 B2
(45) Date of Patent: May 28, 2024

(54) R-FE-B-BASED SINTERED MAGNET WITH LOW B CONTENT AND PREPARATION METHOD THEREFOR

(71) Applicant: FUJIAN GOLDEN DRAGON RARE-EARTH Co., Ltd., Longyan (CN)

(72) Inventors: Qin Lan, Fujian (CN); Yan Zhou, Fujian (CN); Hiroshi Nagata, Fujian (CN); Yao Shi, Fujian (CN)

(73) Assignee: FUJIAN GOLDEN DRAGON RARE-EARTH Co., Ltd., Fujian (CN)

( * ) Notice: Subject to any disclaimer, the term of this patent is extended or adjusted under 35 U.S.C. 154(b) by 879 days.

(21) Appl. No.: 16/964,645

(22) PCT Filed: Jun. 17, 2019

(86) PCT No.: PCT/CN2019/091536

§ 371 (c)(1),
(2) Date: Jul. 24, 2020

(87) PCT Pub. No.: WO2019/242581

PCT Pub. Date: Dec. 26, 2019

(65) Prior Publication Data

US 2021/0054484 A1 Feb. 25, 2021

(30) Foreign Application Priority Data

Jun. 19, 2018 (CN) ......................... 201810629609.3

(51) Int. Cl.
*B22F 3/24* (2006.01)
*C22C 33/02* (2006.01)
(Continued)

(52) U.S. Cl.
CPC ................ *C22C 38/16* (2013.01); *B22F 3/24* (2013.01); *C22C 33/02* (2013.01); *C22C 38/002* (2013.01);
(Continued)

(58) Field of Classification Search
CPC .. H01F 1/0576; H01F 1/0577; H01F 41/0266; H01F 41/0273; B22F 3/24;
(Continued)

(56) References Cited

U.S. PATENT DOCUMENTS

2013/0271248 A1* 10/2013 Nagata .................... C22C 38/16 427/127
2014/0290803 A1* 10/2014 Kato ..................... H01F 1/0577 420/83

FOREIGN PATENT DOCUMENTS

CN 103890868 A 6/2014
CN 106448985 A 2/2017
WO WO-2016208508 A1 * 12/2016 ................ B22F 1/00

OTHER PUBLICATIONS

"Analytical electron microscopy of Ti-doped Nd-TM-B magnets", Journal of Applied Physics, Kitano et. al., vol. 69, pp. 6055-6057, Apr. 15, 1991 (Kitano) (Year: 1991).*

(Continued)

*Primary Examiner* — Humera N. Sheikh
*Assistant Examiner* — Kevin C T Li
(74) *Attorney, Agent, or Firm* — PABST PATENT GROUP LLP

(57) ABSTRACT

Disclosed are an R—Fe—B-based sintered magnet with a low B content and a preparation method therefor. The sintered magnet comprises the following components: 28.5 wt %-31.5 wt % of R, 0.86 wt %-0.94 wt % of B, 0.2 wt %-1 wt % of Co, 0.2 wt %-0.45 wt % of Cu, 0.3 wt %-0.5 wt % of Ga, 0.02 wt %-0.2 wt % of Ti, and 61 wt %-69.5 wt %
(Continued)

of Fe. The sintered magnet has an $R_6$-$T_{13-\delta}M_{1+\delta}$ series phase accounting for 75% or more of the total volume of grain boundaries. The present invention selects optimal content ranges of R, B, Co, Cu, Ga, and Ti, and forms an $R_6$-$T_{13-\delta}M_{1+\delta}$ series phase of a special composition and increases its volume fraction in grain boundary phases, so as to acquire higher Hcj and SQ values.

8 Claims, 1 Drawing Sheet

(51) Int. Cl.

| | |
|---|---|
| ***C22C 38/00*** | (2006.01) |
| ***C22C 38/10*** | (2006.01) |
| ***C22C 38/14*** | (2006.01) |
| ***C22C 38/16*** | (2006.01) |
| ***H01F 1/057*** | (2006.01) |
| ***H01F 41/02*** | (2006.01) |

(52) U.S. Cl.
CPC ............ *C22C 38/005* (2013.01); *C22C 38/10* (2013.01); *C22C 38/14* (2013.01); *H01F 1/0577* (2013.01); *H01F 41/0266* (2013.01); *B22F 2003/248* (2013.01); *B22F 2201/20* (2013.01); *B22F 2202/05* (2013.01); *B22F 2301/355* (2013.01); *C22C 2202/02* (2013.01)

(58) Field of Classification Search
CPC ............ B22F 2003/248; B22F 2201/20; B22F 2202/05; B22F 2301/355; C22C 38/002; C22C 38/004; C22C 38/10; C22C 38/14; C22C 38/16; C22C 2202/02; C22C 33/02
See application file for complete search history.

(56) References Cited

OTHER PUBLICATIONS

International Search Report and English Translation in International Application No. PCT/CN2019/091536 dated Sep. 23, 2019, 5 pages.
Written Opinion in International Application No. PCT/CN2019/091536 dated Sep. 23, 2019, 3 pages.

* cited by examiner

R-FE-B-BASED SINTERED MAGNET WITH LOW B CONTENT AND PREPARATION METHOD THEREFOR

TECHNICAL FIELD

The present invention relates to the technical field of magnet manufacturing, in particular to an R—Fe—B-based sintered magnet with a low B content.

BACKGROUND

R-T-B-based sintered magnets (R, rare earth elements; T, transition metal elements; B, boron) are widely used in the fields of wind power generation, electric vehicles, and inverter air conditioners by virtue of their excellent magnetic properties. Demands of these fields have increasingly expanded, and manufacturers also have gradually increasing magnet performance requirements.

In order to improve Hcj, more heavy rare earth elements such as Dy and Tb with a larger anisotropy field are usually added to the R-T-B-based sintered magnets. Yet this approach has the problem of a reduced residual magnetic flux density Br. Moreover, heavy rare earth resources such as Dy and Tb are limited, expensive, and suffer from problems such as unstable supply and large price fluctuations. Therefore, it is required to develop technology for reducing the usage amount of heavy rare earths such as Dy and Tb and for increasing the Hcj and Br of R-T-B-based sintered magnets.

International Publication No. 2013/008756 describes that by limiting the B content to a relatively small specific range compared to those of conventionally commonly used R-T-B-based alloys, and containing one or more metal elements M selected from Al, Ga, and Cu, an $R_2T_{17}$ phase is generated. By adequately ensuring the volume fraction of a transition metal-rich phase $R_6T_{13}M$ generated from the $R_2T_{17}$ phase as a raw material, an R-T-B-based sintered magnet with a suppressed heavy rare earth content and an increased Hcj is acquired.

CN 105453195A describes that an R-T-Ga phase is formed by lowering the B content compared to common R-T-B alloys. However, according to research results of the inventors, the R-T-Ga phase also has some magnetism. When a large amount of R-T-Ga phase is present in the crystal grains of an R-T-B-based sintered magnet, the increase in Hcj is hindered. In order to suppress the amount of the R-T-Ga phase generated in the R-T-B-based sintered magnet to reach a low level, it is necessary to set the R amount and the B amount to appropriate ranges so as to reduce the generated amount of the $R_2T_{17}$ phase, and set the R amount and the Ga amount to optimum ranges corresponding to the generated amount of the $R_2T_{17}$ phase. It is considered that the suppression of the generated amount of the $R_6$-$T_{13}$-Ga phase causes more R—Ga and R—Ga—Cu phases to be formed at grain boundaries, thereby acquiring a magnet with a high Br and a high Hcj. Furthermore, it is considered that the suppression of the generated amount of the R-T-Ga phase at an alloy powder stage can finally suppress the generated amount of the R-T-Ga phase in the R-T-B-based sintered magnet that is finally acquired.

In summary, the prior art focuses on the research of R-T-Ga phases of sintered magnets as a whole and ignores different performance of R-T-Ga phases of different compositions. Thus in different documents of the prior art, the research arrives at conclusions where the R-T-Ga phases have opposite technical effects.

SUMMARY

The purpose of the present invention is to overcome the shortcomings of the prior art and provide an R—Fe—B-based sintered magnet with a low-B content, wherein optimal content ranges of R, B, Co, Cu, Ga, and Ti are selected so as to reach a higher Br value than those of magnets with conventional B contents while ensuring an optimal volume fraction of a main phase; and acquire higher Hcj and SQ values by forming an $R_6$-$T_{13-\delta}M_{1+\delta}$ series phase of a special composition and increasing its volume fraction in grain boundary phases.

The technical solution provided by the present invention is as follows:

An R—Fe—B-based sintered magnet with a low B content, containing an $R_2Fe_{14}B$-type main phase, the R being at least one rare earth element comprising Nd, wherein the sintered magnet comprises the following components:

28.5 wt %-31.5 wt % of R,
0.86 wt %-0.94 wt % of B,
0.2 wt %-1 wt % of Co,
0.2 wt %-0.45 wt % of Cu,
0.3 wt %-0.5 wt % of Ga,
0.02 wt %-0.2 wt % of Ti, and
61 wt %-69.5 wt % of Fe; and the sintered magnet has an $R_6$-$T_{13-\delta}$-$M_{1+\delta}$ series phase accounting for 75% or more of the total volume of grain boundaries, wherein T is at least one selected from Fe or Co, M comprises 80 wt % or more of Ga and 20 wt % or below of Cu, and δ is (−0.14-0.04).

The wt % in the present invention is a weight percentage.

The R mentioned in the present invention is selected from at least one of the group of elements consisting of Nd, Pr, Dy, Tb, Ho, La, Ce, Pm, Sm, Eu, Gd, Er, Tm, Yb, Lu, and yttrium.

In the magnet with low TRE (total rare earths) and a low B content, the Br of the magnet increases due to the reduction of impurity phases and a high volume fraction of a main phase. Furthermore, Co, Cu, Ga, and Ti in specific content ranges are added to form the aforementioned $R_6$-$T_{13-\delta}$-$M_{1+\delta}$ series phase of the special composition. Its volume fraction in grain boundary phases of the sintered magnet is increased, so that the grain boundary distribution is more uniform and continuous and to form a thin layer of grain boundary Nd-rich phase, so as to further optimize the grain boundaries and produce a de-magnetic-coupling effect and improve the nucleation field of reversal magnetization domain nuclei, thereby significantly improving the Hcj and increasing squareness.

In the above $R_6$-$T_{13-\delta}$-$M_{1+\delta}$ series phase of the special composition, M may be at least one element selected from the group consisting of Cu, Ga, or Ti, and etc. and must contain Ga, for example, in the case where $R_6$-$T_{13}(Ga_{1-y-s}Ti_yCu_s)$ is formed.

In a recommended embodiment, the sintered magnet is a sintered magnet having been subjected to heat treatment. The heat treatment stage helps to form more of the aforementioned $R_6$-$T_{13-\delta}$-$M_{1+\delta}$ series phase (referred to simply as $R_6$-$T_{13}$-M phase) of the special composition to increase the Hcj.

In a recommended embodiment, the sintered magnet is prepared in the following steps: a process of preparing a molten raw material component liquid of the sintered magnet at a cooling rate of $10^{2}$° C./sec-$10^{4}$° C./sec into a quenched alloy; a process of crushing the quenched alloy by alloy hydrogen absorption, and subsequently preparing the crushed quenched alloy into a fine powder by micro-pulverization; and acquiring a formed body using a magnetic field forming method or by hot-pressing thermal deformation, and sintering the formed body in a vacuum or inert gas at a temperature of 900° C.-1100° C. followed by heat treatment to acquire a product.

In the present invention, the cooling rate is $10^{2}$° C./sec-$10^{4}$° C./sec, and the sintering temperature of 900° C.-1100° C. is a conventional choice in the industry. Therefore, in the embodiments, the foregoing ranges of cooling rate and sintering temperature are not tested and verified.

Another technical solution provided by the present invention is as follows:

A method for preparing an R—Fe—B-based sintered magnet with a low B content, the sintered magnet containing an $R_2Fe_{14}B$-type main phase, the R being at least one rare earth element comprising Nd, wherein the sintered magnet comprises the following components:

28.5 wt %-31.5 wt % of R, 0.86 wt %-0.94 wt % of B, 0.2 wt %-1 wt % of Co, 0.2 wt %-0.45 wt % of Cu, 0.3 wt %-0.5 wt % of Ga, 0.02 wt %-0.2 wt % of Ti, and 61 wt %-69.5 wt % of Fe; and the sintered magnet is prepared using the following method: a process of preparing a molten raw material component liquid of the sintered magnet at a cooling rate of $10^{2}$° C./sec-$10^{4}$° C./sec into an alloy for the sintered magnet; a process of crushing the alloy by alloy hydrogen absorption, and subsequently preparing the crushed alloy into a fine powder by micro-pulverization; and acquiring a formed body using a magnetic field forming method, and sintering the formed body in a vacuum or inert gas at a temperature of 900° C.-1100° C. followed by heat treatment to acquire a product.

In this way, it is possible to increase the volume fraction of the above $T_{13-\delta}M_{1+\delta}$ series phase of the special composition in the sintered magnet with the low TRE (total rare earths) and the low B content, so that the grain boundary distribution is more uniform and continuous and forming a thin layer of grain boundary Nd-rich phase, so as to further optimize the grain boundaries and produce a de-magnetic-coupling effect.

In the present invention, the temperature range of heat treatment is a conventional choice in the industry; therefore, in the embodiments, the above temperature range is not tested and verified.

It should be noted that the contents and ranges in the present invention such as the Fe content of 61 wt %-69.5 wt %, δ of (−0.14-0.04), the cooling rate of $10^{2}$° C./sec-$10^{4}$° C./sec, the sintering temperature of 900° C.-1100° C., etc. are conventional choices in the industry. Therefore, in the embodiments, the ranges of Fe, δ, etc. are not tested and verified.

It should be noted that any numerical range disclosed in the present invention includes all point values in this range.

DETAILED DESCRIPTION

Figure 1:
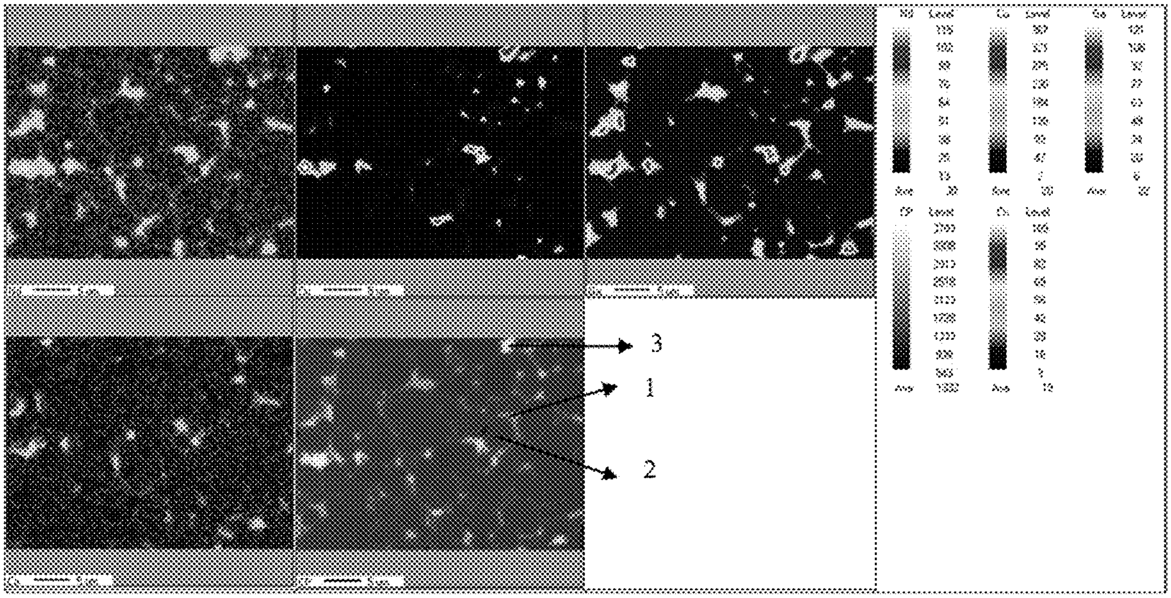
FIG. 1 is a distribution diagram of Nd, Cu, Ga, and Co formed by EPMA mapping of a sintered magnet in Embodiment 1.7.

The present disclosure is further described in detail in conjunction with embodiments hereinafter.

The magnetic property evaluation process, component determination, and FE-EPMA testing methods mentioned in the embodiments are as follows:

Magnetic Property Evaluation Process: the magnetic performance of a sintered magnet is determined by using the NIM-10000H type nondestructive testing system for BH large rare earth permanent magnet from National Institute of Metrology of China.

Component Determination: Each component is determined using a high-frequency inductively coupled plasma emission spectrometer (ICP-OES). In addition, O (oxygen amount) is determined using a gas analysis device based on a gas fusion-infrared absorption method; N (nitrogen amount) is determined using a gas analysis device based on a gas fusion-thermal conductivity method; and C (carbon amount) is determined using a gas analysis device based on a combustion-infrared absorption method.

FE-EPMA Testing: The surface which is perpendicular to the orientation direction of a sintered magnet is polished, and is detected using a field emission electron probe microanalyzer (FE-EPMA) [Japan Electron Optics Laboratory Co., Ltd. (JEOL), 8530F]. First, an $R_6$-$T_{13}$-M phase in a magnet and the contents of Ga and Cu in M are determined by quantitative analysis and mapping under test conditions of an acceleration voltage of 15 kV and a probe beam current of 50 nA. Then statistics on the volume fraction of the $R_6$-$T_{13}$-M phase are collected by backscatter electron imaging (BSE). The specific method is as follows: randomly capturing 10 BSE images with a magnification of 2000, and using image analysis software to calculate the proportion.

In the present invention, the selected heat treatment temperature range and heat treatment method are conventional choices in the industry and is usually a two-stage heat treatment, in which the first-stage heat treatment temperature is 800° C.-950° C., and the second-stage heat treatment temperature is 400° C.-650° C.

In a recommended embodiment, the components comprise X of 5.0 wt % or below and inevitable impurities, wherein X is selected from at least one of the group of elements consisting of Zn, Al, In, Si, Ti, V, Cr, Mn, Ni, Ge, Zr, Nb, Mo, Pd, Ag, Cd, Sn, Sb, Hf, Ta, and W. When X comprises at least one of Nb, Zr, or Cr, the total content of Nb, Zr, and Cr is 0.20 wt % or below.

In a recommended embodiment, the balance is Fe.

In a recommended embodiment, the inevitable impurities comprise O, and the O content of the sintered magnet is 0.5 wt % or below. Although magnets with low oxygen contents (5000 ppm or below) have good magnetic properties, grains thereof tend to aggregate and grow during sintering at higher temperatures. Therefore, the magnets are more sensitive to respond to effects produced by extremely small microstructural improvements of quenched alloys, powders, and sintered magnets. At the same time, due to the low oxygen content, less R—O compounds are present, R can be more fully utilized to form the $R_6$-$T_{13}$-M phase to increase the Hcj, and R—O compound impurity phases are less and the squareness increases.

In addition, the inevitable impurities mentioned in the present invention further comprise small amounts of C, N, S, P, and other impurities inevitably mixed in the raw materials or in the manufacturing process. Therefore, in the manufacturing process of the sintered magnet mentioned in the present invention, it is better to control the C content to be 0.25 wt % or below, more preferably 0.1 wt % or below, the N content to be 0.15 wt % or below, the S content to be 0.05 wt % or below, and the P content to be 0.05 wt % or below.

It should be noted that the steps of manufacturing the magnet in the low oxygen environment belong to the prior art, and all embodiments of the present disclosure are implemented with the steps of manufacturing the magnet in the low oxygen environment, which are not described in detail herein again.

In a recommended embodiment, the micro-pulverization is a jet pulverization process. In the above manner, the degree of dispersion of the $R_6$-$T_{13}$-M phase in the sintered magnet is further increased.

In a recommended embodiment, the content of Dy, Tb, Gd, or Ho in R is 1% or below. For sintered magnets with a Dy, Tb, Gd, or Ho content of 1% or below, the presence of the $R_6$-$T_{13-\delta}M_{1+\delta}$ series phase improves the effect of increasing the Hcj of the magnets more significantly.

Embodiment 1

Raw material Preparation Process: Nd and Dy with a purity of 99.5%, industrial Fe—B, industrial pure Fe, and Co, Cu, Ti, Ga, and Al with a purity of 99.9% were prepared.

Smelting Process: The prepared raw materials were put into a crucible made of alumina, and vacuum smelting was carried out in a high-frequency vacuum induction smelting furnace in a vacuum at $10^{-2}$ Pa at a temperature of 1500° C. or below.

Casting Process: An Ar gas was introduced into the smelting furnace after the vacuum smelting until the gas pressure reached 50,000 Pa, and then casting was performed using a single-roller quenching process at a cooling rate of $10^{2}$° C./sec-$10^{4}$° C./sec to acquire a quenched alloy. The quenched alloy was subjected to thermal insulation heat treatment at 600° C. for 60 minutes, and then cooled to room temperature.

Hydrogen Decrepitation Process: A hydrogen decrepitation furnace in which the quenched alloy was placed was vacuumized at room temperature, and then a hydrogen gas with a purity of 99.5% was introduced into the hydrogen decrepitation furnace. The hydrogen pressure was maintained at 0.1 MPa. After full hydrogen absorption, the hydrogen decrepitation furnace was vacuumized while the temperature was raised to a temperature of 500° C., then cooling was performed, and the hydrogen decrepitated powder was extracted.

Micro-Pulverization Step: Under a nitrogen atmosphere with an oxidizing gas content of 100 ppm or below, the hydrogen decrepitated powder was subjected to jet mill pulverization under a pressure of 0.4 MPa for 2 hours in a pulverization chamber to acquire a fine powder. The oxidizing gas refers to oxygen or moisture.

Methyl octoate was added to the jet mill pulverized powder. The amount of the methyl octoate added was 0.15% of the weight of the mixed powder, and the mixture was then fully mixed using a V-type mixer.

Magnetic Field Forming Process: Using a right-angle oriented magnetic field forming machine, in a 1.8 T oriented magnetic field and under a forming pressure of 0.4 ton/cm$^2$, the above powder with the methyl octoate added was formed into a cube with a side length of 25 mm by primary forming, and the cube was demagnetized in a 0.2 T magnetic field after the primary forming.

In order to prevent the formed body from being exposed to air after the primary forming, the formed body was sealed, and was then subjected to secondary forming using a secondary forming machine (isostatic pressing forming machine) under a pressure of 1.4 ton/cm$^2$.

Sintering Process: Each formed body was transferred to a sintering furnace for sintering in a vacuum at $10^{-3}$ Pa, each maintained at 200° C. and 800° C. for 2 hours, followed by sintering at 1060° C. for 2 hours. Afterwards, an Ar gas was introduced until the gas pressure reached 0.1 MPa, and then the sintered body was cooled to room temperature.

Heat Treatment Process: The sintered body was subjected to primary heat treatment at 900° C. for 2 hours in a high-purity Ar gas, followed by secondary heat treatment at 520° C. for 2 hours, and was then cooled to room temperature and extracted.

Processing Process: The sintered body was processed into a magnet with a diameter of 10 mm and a thickness of 5 mm, with the direction of the thickness being the orientation direction of the magnetic field, to acquire a sintered magnet.

The magnets prepared from the sintered bodies in the embodiments and comparative examples were directly subjected to ICP-OES testing and magnetic property testing to evaluate their magnetic properties. The components and evaluation results of the magnets in the embodiments and comparative examples are shown in Table 1 and Table 2:

TABLE 1

| | Compositional Proportions of Elements (wt %) | | | | | | | | | |
|---|---|---|---|---|---|---|---|---|---|---|
| No. | Nd | Dy | B | Co | Cu | Ga | Ti | Al | O | Fe |
| Comparative Example 1.1 | 28.5 | 0.5 | 0.83 | 0.42 | 0.40 | 0.42 | 0.05 | 0.2 | 0.1 | Balance |
| Embodiment 1.1 | 28.5 | 0.5 | 0.86 | 0.42 | 0.40 | 0.42 | 0.05 | 0.2 | 0.1 | Balance |
| Embodiment 1.2 | 28.5 | 0.5 | 0.89 | 0.42 | 0.40 | 0.42 | 0.05 | 0.2 | 0.1 | Balance |
| Embodiment 1.3 | 28.5 | 0.5 | 0.92 | 0.42 | 0.40 | 0.42 | 0.05 | 0.2 | 0.1 | Balance |
| Embodiment 1.4 | 28.5 | 0.5 | 0.94 | 0.42 | 0.40 | 0.42 | 0.05 | 0.2 | 0.1 | Balance |
| Comparative Example 1.2 | 28.5 | 0.5 | 0.96 | 0.42 | 0.40 | 0.42 | 0.05 | 0.2 | 0.1 | Balance |
| Comparative Example 1.3 | 28.0 | 0 | 0.88 | 0.45 | 0.30 | 0.35 | 0.1 | 0.1 | 0.1 | Balance |
| Embodiment 1.5 | 28.5 | 0 | 0.88 | 0.45 | 0.30 | 0.35 | 0.1 | 0.1 | 0.1 | Balance |
| Embodiment 1.6 | 29.5 | 0 | 0.88 | 0.45 | 0.30 | 0.35 | 0.1 | 0.1 | 0.1 | Balance |
| Embodiment 1.7 | 30.5 | 0 | 0.88 | 0.45 | 0.30 | 0.35 | 0.1 | 0.1 | 0.1 | Balance |
| Embodiment 1.8 | 31.5 | 0 | 0.88 | 0.45 | 0.30 | 0.35 | 0.1 | 0.1 | 0.1 | Balance |
| Comparative Example 1.4 | 32.0 | 0 | 0.88 | 0.45 | 0.30 | 0.35 | 0.1 | 0.1 | 0.1 | Balance |

TABLE 2

| Evaluation of Magnetic Properties of Embodiments | | | | |
|---|---|---|---|---|
| No. | Br (kGs) | Hcj (kOe) | SQ (%) | (BH)max (MGOe) |
| Comparative Example 1.1 | 14.15 | 10.0 | 82.3 | 47.5 |
| Embodiment 1.1 | 13.97 | 18.1 | 98.4 | 47.1 |
| Embodiment 1.2 | 13.9 | 19.3 | 99.4 | 46.4 |
| Embodiment 1.3 | 13.95 | 19.7 | 99.6 | 46.9 |
| Embodiment 1.4 | 13.8 | 18.6 | 99.3 | 45.9 |
| Comparative Example 1.2 | 13.35 | 16.0 | 99.2 | 43.0 |
| Comparative Example 1.3 | 14.18 | 8.0 | 85.6 | 48.5 |
| Embodiment 1.5 | 14.22 | 17.8 | 98.4 | 48.8 |
| Embodiment 1.6 | 14.14 | 18.2 | 99.4 | 48.2 |
| Embodiment 1.7 | 14.05 | 18.7 | 99.5 | 47.6 |
| Embodiment 1.8 | 13.89 | 18.5 | 99.4 | 46.6 |
| Comparative Example 1.4 | 13.52 | 15.0 | 99.4 | 44.0 |

TABLE 3

| FE-EPMA Single Point Quantitative Analysis Result of Sintered Magnet in Embodiment 1.7 | | | | | | | |
|---|---|---|---|---|---|---|---|
| (at %) | Nd | Fe | Co | Ga | Cu | B | Phase component |
| Point 1 | 29.99 | 65.03 | 0.31 | 4.23 | 0.44 | 0 | $R_6$-$T_{13}$-M |
| Point 2 | 11.96 | 80.4 | 1.55 | 0.21 | 0.07 | 5.81 | $R_2$-$T_{14}$-B |

Our conclusion is as follows:

For a sintered magnet with low TRE (total rare earths), when the B content is less than 0.86 wt %, due to the overly low B content, excessive 2-17 phases are generated, and synergistic addition of Co, Cu, Ga, and Ti forms only a small amount of $R_6$-$T_{13}$-M phase in grain boundaries, which has no obvious improvement to the Hcj of the sintered magnet and decreases the squareness. By contrast, when the B content exceeds 0.94 wt %, because the B content increases, a B-rich phase is generated, such as $R_{1.1}Fe_4B_4$, resulting in a decrease in the volume fraction of a main phase and a decrease in the Br of the sintered magnet, the synergistic addition of Co, Cu, Ga, and Ti forms little or no $R_6$-$T_{13}$-M phase, and there is no obvious improvement to the Hcj of the sintered magnet. However, for a B content of 0.86 wt %-0.94 wt %, the synergistic addition of Co, Cu, Ga, and Ti ensures that a sufficient volume fraction of $R_6$-$T_{13}$-M phase is generated in the grain boundaries, and there is more obvious improvement to the properties of the sintered magnet.

In addition, for a sintered magnet with a low B content, when the TRE (total rare earths) content is less than 28.5 wt %, the TRE content is overly low and α-Fe precipitates, resulting in a decrease in the properties of the sintered magnet. By contrast, when the TRE content exceeds 31.5 wt %, since the TRE content increases, the volume fraction of a main phase decreases; therefore, the Br of the sintered magnet decreases. Furthermore, synergistic addition of Co, Cu, Ga, and Ti has no obvious improvement to the Hcj of the sintered magnet because R generates more other R—Ga—Cu phases in grain boundaries, which leads to a decrease in the proportion of an $R_6$-$T_{13}$-M phase. However, for TRE of 28.5 wt %-31.5 wt %, the synergistic addition of Co, Cu, Ga, and Ti ensures that a sufficient volume fraction of $R_6$-$T_{13}$-M phase is generated in the grain boundaries of the low-B magnet, and there is more obvious improvement to the properties of the sintered magnet.

The sintered magnet in Embodiment 1.7 was subjected to an FE-EPMA test, and the results are shown in FIG. 1 and Table 3, where FIG. 1 is the concentration distribution of Nd, Cu, Ga, and Co and an BSE image of corresponding positions, and Table 3 is single-point quantitative analysis results showing that at least three phases are present in the BSE image. The gray-white region 1 is an $R_6$-$T_{13}$-M phase, where R is Nd, T is mainly Fe and Co, M comprises 80 wt % or more of Ga and 20 wt % or below of Cu. The black region 2 is an $R_2Fe_{14}B$ main phase, and the bright white region 3 is other R-rich phases. Ten BSE images with a magnification of 2000 were captured randomly, and the volume fraction of the $R_6$-$T_{13}$-M phase was calculated using image analysis software, which can show that the $R_6$-$T_{13}$-M phase accounted for 80% or more of the total volume of grain boundaries in the sample of this embodiment. Similarly, the sintered magnets in Embodiments 1.1-1.6 and Embodiment 1.8 were subjected to FE-EPMA tests, in all of which it can be observed that the volume of the $R_6$-$T_{13}$-M phase accounted for 75% or more of the total volume of grain boundaries. In the $R_6$-$T_{13}$-M phase, R is Nd, or Nd and Dy, T is mainly Fe and Co, and M comprises 80 wt % or more of Ga and 20 wt % or below of Cu.

Figure 2:
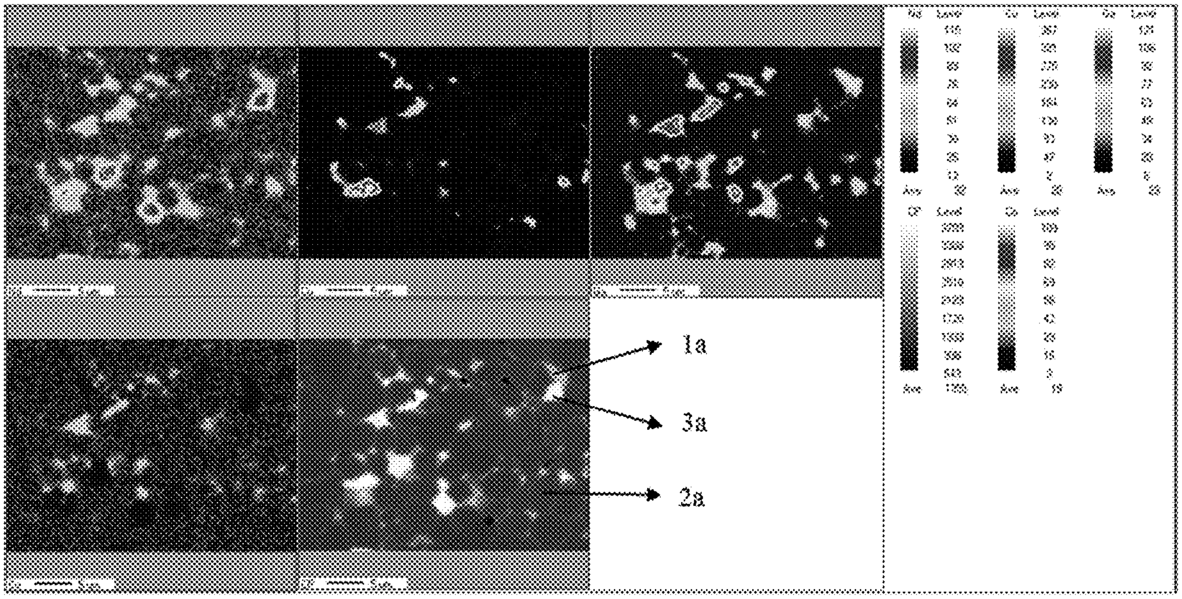
FIG. 2 is a distribution diagram of Nd, Cu, Ga, and Co formed by EPMA mapping of a sintered magnet in Comparative Example 1.4.

An FE-EPMA test was performed on Comparative Example 1.4. The results are shown in FIG. 2, which represents the concentration distribution of Nd, Cu, Ga, and Co and an BSE image of corresponding positions. The gray-white region 1a in the BSE image is an $R_6$-$T_{13}$-M phase, the black region 2a is an $R_2Fe_{14}B$ main phase, and the bright white region 3a is other R-rich phases. It can be seen that the gray-white $R_6$-$T_{13}$M phase in the grain boundary phases of the comparative example has a small proportion, and most are bright white Nd-rich phases of other compositions.

Comparative Examples 1.1-1.3 were tested, in which almost no $R_6$-$T_{13}$M phase was observed in the grain boundaries of the sintered magnets, or the volume of the $R_6$-$T_{13}$M phase was less than 75% of the total volume of the grain boundaries.

Embodiment 2

Raw Material Preparation Process: Nd and Dy with a purity of 99.8%, industrial Fe—B, industrial pure Fe, and Co, Cu, Ti, Ga, Zr, and Si with a purity of 99.9% were prepared.

Smelting Process: The prepared raw materials were put into a crucible made of alumina, and vacuum smelting was carried out in a high-frequency vacuum induction smelting furnace in a vacuum at $5\times10^{-2}$ Pa at a temperature of 1500° C. or below.

Casting Process: An Ar gas was introduced into the smelting furnace after the vacuum smelting until the gas pressure reached 55,000 Pa, under which casting was performed, followed by quenching at a cooling rate of $10^{2}$° C./sec-$10^{4}$° C./sec to acquire a quenched alloy.

Hydrogen Decrepitation Process: A hydrogen decrepitation furnace in which the quenched alloy was placed was vacuumized at room temperature, and then a hydrogen gas with a purity of 99.9% was introduced into the hydrogen decrepitation furnace. The hydrogen pressure was maintained at 0.15 MPa. After full hydrogen absorption, the hydrogen decrepitation furnace was vacuumized while the temperature was raised for full dehydrogenation, then cooling was performed, and the hydrogen decrepitated powder was extracted.

Micro-Pulverization Step: Under a nitrogen atmosphere with an oxidizing gas content of 150 ppm or below, the hydrogen decrepitated powder was subjected to jet mill pulverization under a pressure of 0.38 MPa for 3 hours in a pulverization chamber to acquire a fine powder. The oxidizing gas refers to oxygen or moisture.

Zinc stearate was added to the jet mill pulverized powder. The amount of the zinc stearate added was 0.12% of the weight of the mixed powder, and the mixture was then fully mixed using a V-type mixer.

Magnetic Field Forming Process: Using a right-angle oriented magnetic field forming machine, in a 1.6 T oriented magnetic field, and under a forming pressure of 0.35 ton/cm$^2$, the above powder with the zinc stearate added was formed into a cube with a side length of 25 mm by primary forming, and the cube was demagnetized in a 0.2 T magnetic field after the primary forming.

In order to prevent the formed body from being exposed to air after the primary forming, the formed body was sealed and was then subjected to secondary forming using a secondary forming machine (isostatic pressing forming machine) under a pressure of 1.3 tons/cm$^2$.

Sintering Process: Each formed body was transferred to a sintering furnace for sintering in a vacuum at $5\times10^{-3}$ Pa, each maintained at 300° C. and 600° C. for 1 hour, followed by sintering at 1040° C. for 2 hours. Afterwards, an Ar gas was introduced until the gas pressure reached 0.1 MPa, and then the sintered body was cooled to room temperature.

Heat Treatment Process: The sintered body was subjected to primary heat treatment at 880° C. for 3 hours in a high-purity Ar gas, followed by secondary heat treatment at 500° C. for 3 hours, and was then cooled to room temperature and extracted.

Processing Process: The sintered body was processed into a magnet with a diameter of 20 mm and a thickness of 5 mm, with the direction of the thickness being the orientation direction of the magnetic field, to acquire a sintered magnet.

The magnets prepared from the sintered bodies in the embodiments and comparative examples were directly subjected to ICP-OES testing and magnetic property testing to evaluate their magnetic properties. The components and evaluation results of the magnets in the embodiments and comparative examples are shown in Table 4 and Table 5:

TABLE 4

Compositional Proportions of Elements (wt %)

| No. | Nd | Dy | B | Co | Cu | Ga | Ti | Zr | Si | O | Fe |
|---|---|---|---|---|---|---|---|---|---|---|---|
| Comparative Example 2.1 | 30.0 | 0.1 | 0.92 | 0.4 | 0.1 | 0.45 | 0.12 | 0.1 | 0.2 | 0.12 | Balance |
| Embodiment 2.1 | 30.0 | 0.1 | 0.92 | 0.4 | 0.2 | 0.45 | 0.12 | 0.1 | 0.2 | 0.12 | Balance |
| Embodiment 2.2 | 30.0 | 0.1 | 0.92 | 0.4 | 0.30 | 0.45 | 0.12 | 0.1 | 0.2 | 0.12 | Balance |
| Embodiment 2.3 | 30.0 | 0.1 | 0.92 | 0.4 | 0.45 | 0.45 | 0.12 | 0.1 | 0.2 | 0.12 | Balance |
| Comparative Example 2.2 | 30.0 | 0.1 | 0.92 | 0.4 | 0.55 | 0.45 | 0.12 | 0.1 | 0.2 | 0.12 | Balance |
| Comparative Example 2.3 | 29.9 | 0.1 | 0.89 | 0.1 | 0.40 | 0.4 | 0.08 | 0.2 | 0.15 | 0.12 | Balance |
| Embodiment 2.4 | 29.9 | 0.1 | 0.89 | 0.2 | 0.40 | 0.4 | 0.08 | 0.2 | 0.15 | 0.12 | Balance |
| Embodiment 2.5 | 29.9 | 0.1 | 0.89 | 0.5 | 0.40 | 0.4 | 0.08 | 0.2 | 0.15 | 0.12 | Balance |
| Embodiment 2.6 | 29.9 | 0.1 | 0.89 | 0.8 | 0.40 | 0.4 | 0.08 | 0.2 | 0.15 | 0.12 | Balance |
| Embodiment 2.7 | 29.9 | 0.1 | 0.89 | 1.0 | 0.40 | 0.4 | 0.08 | 0.2 | 0.12 | 0.12 | Balance |
| Comparative Example 2.4 | 29.9 | 0.1 | 0.89 | 1.1 | 0.40 | 0.4 | 0.08 | 0.2 | 0.15 | 0.12 | Balance |

TABLE 5

Evaluation of Magnetic Properties of Embodiments

| No. | Br (kGs) | Hcj (kOe) | SQ (%) | (BH)max (MGOe) |
|---|---|---|---|---|
| Comparative Example 2.1 | 14.01 | 15 | 88.5 | 47.4 |
| Embodiment 2.1 | 14.08 | 17.5 | 99.2 | 47.9 |
| Embodiment 2.2 | 14.03 | 18.1 | 99.2 | 47.5 |
| Embodiment 2.3 | 14.05 | 17.9 | 99.3 | 47.7 |
| Comparative Example 2.2 | 13.91 | 14.5 | 97.6 | 46.7 |
| Comparative Example 2.3 | 13.81 | 15.6 | 98.2 | 46.0 |
| Embodiment 2.4 | 13.98 | 17.2 | 99.5 | 47.2 |
| Embodiment 2.5 | 14.08 | 18.2 | 99.6 | 47.9 |
| Embodiment 2.6 | 14.02 | 17.6 | 99.4 | 47.5 |
| Embodiment 2.7 | 14.02 | 17.3 | 99.6 | 47.5 |
| Comparative Example 2.4 | 13.85 | 15.2 | 99.1 | 46.3 |

Our conclusion is as follows:

For a low TRE (total rare earths) and low B series sintered magnet, when the Cu content is less than 0.2 wt %, due to the overly low Cu content, no sufficient amount of Cu entering grain boundaries exists, synergistic addition of Co, Ga, and Ti does not form an insufficient $R_6$-$T_{13}$-M phase in the grain boundaries, and there is no obvious improvement to the Hcj of the sintered magnet. Similarly, when the Cu content exceeds 0.45 wt %, because the Cu content is excessive, the content of Cu in M in the formed $R_6$-$T_{13}$-M phase is higher than 20%, and the synergistic addition of Co, Ga, and Ti also has no obvious improvement to the properties of the sintered magnet. However, for a Cu content of 0.2 wt %-0.45 wt %, the synergistic addition of Co, Ga, and Ti ensures that 75% or more of the $R_6$-$T_{13}$-M phase is generated in the grain boundaries, the Ga content in M is greater than 80% and the Cu content is less than 20%, and there is more obvious improvement to the properties of the sintered magnet.

For the low TRE (total rare earths) and low B series sintered magnet, when the Co content is less than 0.2 wt %, due to the overly low Co content, other R—Co phases are preferentially formed, synergistic addition of Cu, Ga, and Ti does not form a sufficient $R_6$-$T_{13}$-M phase in the grain boundaries, and there is no obvious improvement to the properties of the sintered magnet. Similarly, when the Co content exceeds 1.0 wt %, due to the excessive Co content, a part of Co enters the grain boundaries, the synergistic addition of Cu, Ga, and Ti forms an $R_6$-$T_{13}$-M phase with a Ga content lower than 80% in M, and there is no obvious improvement to the properties of the sintered magnet. However, for a Co content of 0.2 wt %-1.0 wt %, the synergistic addition of Cu, Ga, and Ti ensures that 75% or more of the $R_6$-$T_{13}$-M phase is generated in the grain boundaries, the Ga content in M is greater than 80% and the Cu content is lower than 20%, and there is more obvious improvement to the properties of the sintered magnet.

Similarly, the sintered magnets in Embodiments 2.1-2.7 were subjected to FE-EPMA tests, in which the $R_6$-$T_{13}$-M phase accounting for 75% or more of the total volume of the grain boundaries can be observed, where R is Nd and Dy, T is mainly Fe and Co, and M comprise 80 wt % or more of Ga and 20 wt % or below of Cu.

Furthermore, the sintered magnets in Comparative Example 2.2 and Comparative Example 2.4 were subjected to FE-EPMA tests, in which an $R_6$-$T_{13}$-M phase was observed in the grain boundaries of the sintered magnets. The $R_6$-$T_{13}$-M phase accounted for 75% or more of the total volume of the grain boundaries, but the content of Ga in M was less than 80 wt %.

The sintered magnets of Comparative Example 2.1 and Comparative Example 2.3 were subjected to FE-EPMA tests, in which an $R_6$-$T_{13}$-M phase was observed in the grain boundaries of the sintered magnets. The $R_6$-$T_{13}$-M phase was less than 75% of the total volume of the grain boundaries.

Embodiment 3

Raw Material Preparation Process: Nd and Dy with a purity of 99.8%, industrial Fe—B, industrial pure Fe, and Co, Cu, Ti, Ga, Ni, Nb, and Mn with a purity of 99.9% were prepared.

Smelting Process: The prepared raw materials were put into a crucible made of alumina, and vacuum smelting was carried out in a high-frequency vacuum induction smelting furnace in a vacuum at $5\times10^{-2}$ Pa.

Casting Process: An Ar gas was introduced into the smelting furnace after the vacuum smelting until the gas pressure reached 45,000 Pa, under which casting was performed, followed by quenching at a cooling rate of $10^{2}$° C./sec-$10^{4}$° C./sec to acquire a quenched alloy.

Hydrogen Decrepitation Process: A hydrogen decrepitation furnace in which the quenched alloy was placed was vacuumized at room temperature, and then a hydrogen gas with a purity of 99.9% was introduced into the hydrogen decrepitation furnace. The hydrogen pressure was maintained at 0.12 MPa. After full hydrogen absorption, the hydrogen decrepitation furnace was vacuumized while the temperature was raised for full dehydrogenation, then cooling was performed, and the hydrogen decrepitated powder was extracted.

Micro-Pulverization Step: Under a nitrogen atmosphere with an oxidizing gas content of 200 ppm or below, the hydrogen decrepitated powder was subjected to jet mill pulverization under a pressure of 0.42 MPa for 2 hours in a pulverization chamber to acquire a fine powder. The oxidizing gas refers to oxygen or moisture.

Zinc stearate was added to the jet mill pulverized powder. The amount of the zinc stearate added was 0.1% of the weight of the mixed powder, and the mixture was then fully mixed using a V-type mixer.

Magnetic Field Forming Process: Using a right-angle oriented magnetic field forming machine, in a 1.5 T oriented magnetic field, and under a forming pressure of 0.45 ton/$cm^2$, the above powder with the zinc stearate added was formed into a cube with a side length of 25 mm by primary forming, and the cube was demagnetized after the primary forming.

In order to prevent the formed body from being exposed to air after the primary forming, the formed body was sealed, and was then subjected to secondary forming using a secondary forming machine (isostatic pressing forming machine) under a pressure of 1.2 ton/$cm^2$.

Sintering Process: Each formed body was transferred to a sintering furnace for sintering in a vacuum at $5\times10^{-4}$ Pa, each maintained at 300° C. and 700° C. for 1.5 hours, followed by sintering at 1050° C. Afterwards, an Ar gas was introduced until the gas pressure reached the atmospheric pressure, and then the sintered body was cooled to room temperature by circulation.

Heat Treatment Process: The sintered body was subjected to primary heat treatment at 890° C. for 3.5 hours in a high-purity Ar gas, followed by secondary heat treatment at 550° C. for 3.5 hours, and was then cooled to room temperature and extracted.

Processing Process: The sintered body was processed into a magnet with a diameter of 20 mm and a thickness of 5 mm, with the direction of the thickness being the orientation direction of the magnetic field, to acquire a sintered magnet.

The magnets prepared from the sintered bodies in the embodiments and comparative examples were directly subjected to ICP-OES testing and magnetic property testing to evaluate their magnetic properties. The components and evaluation results of the magnets in the embodiments and comparative examples are shown in Table 6 and Table 7:

TABLE 6

| | Compositional Proportions of Elements (wt %) | | | | | | | | | | | |
|---|---|---|---|---|---|---|---|---|---|---|---|---|
| No. | Nd | Dy | B | Co | Cu | Ga | Ti | Ni | Nb | Mn | O | Fe |
| Comparative Example 3.1 | 29.4 | 1.0 | 0.90 | 0.5 | 0.25 | 0.2 | 0.16 | 0.2 | 0.1 | 0.02 | 0.15 | Balance |
| Embodiment 3.1 | 29.4 | 1.0 | 0.90 | 0.5 | 0.25 | 0.3 | 0.16 | 0.2 | 0.1 | 0.02 | 0.15 | Balance |
| Embodiment 3.2 | 29.4 | 1.0 | 0.90 | 0.5 | 0.25 | 0.4 | 0.16 | 0.2 | 0.1 | 0.02 | 0.15 | Balance |
| Embodiment 3.3 | 29.4 | 1.0 | 0.90 | 0.5 | 0.25 | 0.5 | 0.16 | 0.2 | 0.1 | 0.02 | 0.15 | Balance |
| Embodiment 3.4 | 29.4 | 1.5 | 0.90 | 0.5 | 0.25 | 0.5 | 0.16 | 0.2 | 0.1 | 0.02 | 0.15 | Balance |
| Comparative Example 3.2 | 29.4 | 1.0 | 0.90 | 0.5 | 0.25 | 0.6 | 0.16 | 0.2 | 0.1 | 0.02 | 0.15 | Balance |
| Comparative Example 3.3 | 29.4 | 1.5 | 0.90 | 0.5 | 0.25 | 0.6 | 0.16 | 0.2 | 0.1 | 0.02 | 0.15 | Balance |
| Comparative Example 3.4 | 29.5 | 1.0 | 0.94 | 0.6 | 0.3 | 0.38 | 0.01 | 0.1 | 0.05 | 0.05 | 0.15 | Balance |
| Embodiment 3.5 | 29.5 | 1.0 | 0.94 | 0.6 | 0.3 | 0.38 | 0.02 | 0.1 | 0.05 | 0.05 | 0.15 | Balance |
| Embodiment 3.6 | 29.5 | 1.0 | 0.94 | 0.6 | 0.3 | 0.38 | 0.08 | 0.1 | 0.05 | 0.05 | 0.15 | Balance |
| Embodiment 3.7 | 29.5 | 1.0 | 0.94 | 0.6 | 0.3 | 0.38 | 0.14 | 0.1 | 0.05 | 0.05 | 0.15 | Balance |
| Embodiment 3.8 | 29.5 | 1.0 | 0.94 | 0.6 | 0.3 | 0.38 | 0.2 | 0.1 | 0.05 | 0.05 | 0.15 | Balance |
| Comparative Example 3.5 | 29.5 | 1.0 | 0.94 | 0.6 | 0.3 | 0.38 | 0.24 | 0.1 | 0.05 | 0.05 | 0.15 | Balance |

TABLE 7

| Evaluation of Magnetic Properties of Embodiments | | | | |
|---|---|---|---|---|
| No. | Br (kGs) | Hcj (kOe) | SQ (%) | (BH)max (MGOe) |
| Comparative Example 3.1 | 13.72 | 15.8 | 99 | 45.5 |
| Embodiment 3.1 | 13.88 | 18.9 | 99.6 | 46.5 |
| Embodiment 3.2 | 13.85 | 19.7 | 99.7 | 46.3 |
| Embodiment 3.3 | 13.80 | 20.2 | 99.6 | 46.0 |
| Embodiment 3.4 | 13.78 | 20.3 | 99.7 | 45.6 |
| Comparative Example 3.2 | 13.61 | 16.5 | 98.9 | 44.7 |
| Comparative Example 3.3 | 13.51 | 17.5 | 99.0 | 44.1 |
| Comparative Example 3.4 | 13.52 | 16.2 | 88.7 | 44.1 |
| Embodiment 3.5 | 13.88 | 18.1 | 99.5 | 46.5 |
| Embodiment 3.6 | 13.85 | 18.7 | 99.8 | 46.3 |
| Embodiment 3.7 | 13.82 | 19.4 | 99.5 | 46.1 |
| Embodiment 3.8 | 13.82 | 19.8 | 99.6 | 46.1 |
| Comparative Example 3.5 | 13.72 | 16.2 | 89.4 | 45.5 |

Our conclusion is as follows:

For a low TRE (total rare earths) and low B series sintered magnet, when the Ga content is less than 0.3 wt %, due to the overly low Ga content, synergistic addition of Co, Cu, and Ti forms an $R_6$-$T_{13}$-M phase with a Ga content lower than 80% in M, and there is no obvious improvement to the properties of the sintered magnet. Similarly, when the Ga content exceeds 0.5 wt %, due to the excessive Ga content, other R—Ga—Cu phases (such as an $R_6$-$T_2$-$M_2$ phase) are generated, the volume fraction of these phases in grain boundaries is higher than 25%, the synergistic addition of Co, Cu, and Ti does not form an sufficient $R_6$-$T_{13}$-M phase in the grain boundaries, and there is no obvious improvement to the properties of the sintered magnet. However, for a Ga content of 0.3 wt %-0.5 wt %, the synergistic addition of Co, Cu, and Ti ensures that 75% or more of the $R_6$-$T_{13}$-M phase is generated in the grain boundaries, the Ga content in M is greater than 80% and the Cu content is lower than 20%, and there is more obvious improvement to the properties of the sintered magnet.

At the same time, for the low TRE (total rare earths) and low B series sintered magnet, Ga, Cu, Co, and Ti are kept within the scope of the claims. When the Dy content is lower than 1%, the increase in Hcj is more obvious. For example, compared with Comparative Example 3.2, the Hcj of the sintered magnet in Embodiment 3.3 is increased by 3.7 kOe. Further, in Embodiment 3.4, when the Dy content is greater than 1%, the synergistic addition of Ga, Cu, Co, and Ti increases the Hcj of the sintered magnet by only 2.8 kOe compared with the Hcj of the sintered magnet in Comparative Example 3.3.

For the low TRE (total rare earths) and low B series sintered magnet, when the Ti content is less than 0.02 wt %, due to the overly low Ti content, it is difficult to perform high-temperature sintering, resulting in insufficiently dense sintering, and therefore the Br of the sintered magnet decreases. When sintering is insufficient, synergistic addition of Cu, Ga, and Co cannot form sufficient $R_6$-$T_{13}$-M in the grain boundaries in subsequent heat treatment, and there is no obvious improvement to the properties of the sintered magnet. Similarly, when the Ti content exceeds 0.2 wt %, due to the excessive Ti content, a TiBx phase is easily formed, consequently consuming a part of the B content. The insufficient B content leads to an increase in an $R_2$-$T_{17}$ phase, the synergistic addition of Cu, Ga, and Co does not form a sufficient $R_6$-$T_{13}$M phase in the grain boundaries, and there is no obvious improvement to the properties of the sintered magnet. However, for a Ti content of 0.02 wt %-0.2 wt %, the synergistic addition of Cu, Ga, and Co allows full sintering of the magnet, and it can be ensured that 75% or more of the $R_6$-$T_{13}$-M phase is generated in the grain boundaries in the subsequent heat treatment, the Ga content in M is greater than 80% and the Cu content is lower than 20%, and there is more obvious improvement to the properties of the sintered magnet.

Similarly, the sintered magnets in Embodiments 3.1-3.8 were subjected to FE-EPMA tests, in which the $R_6$-$T_{13}$-M phase accounting for 75% or more of the total volume of the grain boundaries can be observed, where R is Nd and Dy, T is mainly Fe and Co, and M comprises 80 wt % or more of Ga and 20 wt % or below of Cu.

In addition, Comparative Example 3.1 was subjected to an FE-EPMA test, in which an $R_6$-$T_{13}$-M phase was observed in the grain boundaries of the sintered magnet, and the $R_6$-$T_{13}$-M phase accounted for 75% or more of the total volume of the grain boundaries, but the content of Ga in M is less than 80 wt %.

Comparative Examples 3.2, 3.3, 3.4, and 3.5 were subjected to FE-EPMA tests, in which an $R_6$-$T_{13}$-M phase was observed in the grain boundaries of the sintered magnets, and the $R_6$-$T_{13}$-M phase was less than 75% of the total volume of the grain boundaries.

The embodiments described above only serve to further illustrate some particular embodiments of the present disclosure; however, the present invention is not limited to these embodiments. Any simple alterations, equivalent changes, and modifications made to the embodiments above according to the technical essence of the present invention shall fall within the protection scope of the technical solutions of the present invention.

The invention claimed is:

1. An R—Fe—B-based sintered magnet with a low B content, containing an $R_2Fe_{14}B$-type main phase, the R being at least one rare earth element comprising Nd, wherein:

the R—Fe—B-based sintered magnet comprises the following components:

28.5 wt %-31.5 wt % of R,
0.86 wt %-0.94 wt % of B,
0.2 wt %-1 wt % of Co,
0.2 wt %-0.45 wt % of Cu,
0.3 wt %-0.5 wt % of Ga,
0.02 wt %-0.2 wt % of Ti, and
61 wt %-69.5 wt % of Fe, the content of each of Dy, Tb, Gd, or Ho in R is 1 wt % or below, and the R—Fe—B-based sintered magnet has an $R_6$-$T_{13-\delta}M_{1+\delta}$ series phase accounting for 75% or more of a total volume of grain boundaries, wherein T is at least one selected from Fe or Co, M comprises 80 wt % or more of Ga and 20 wt % or below of Cu, and δ is within a range of from −0.14 to 0.04.

2. The R—Fe—B-based sintered magnet with the low B content according to claim 1, wherein:

the components comprise 5.0 wt % or below of X and inevitable impurities,

X is selected from at least one of a group of elements consisting of Zn, Al, In, Si, Ti, V, Cr, Mn, Ni, Ge, Zr, Nb, Mo, Pd, Ag, Cd, Sn, Sb, Hf, Ta, and W, and when X comprises at least one of Nb, Zr, or Cr, a total content of Nb, Zr, and Cr is 0.20 wt % or below.

3. The R—Fe—B-based sintered magnet with the low B content according to claim 2, wherein a balance is Fe.

4. The R—Fe—B-based sintered magnet with the low B content according to claim 2, wherein:

the inevitable impurities comprise O, and an O content of the R—Fe—B-based sintered magnet is 0.5 wt % or below.

5. The R—Fe—B-based sintered magnet with the low B content according to claim 1, wherein the R—Fe—B-based sintered magnet is an R—Fe—B-based sintered magnet having been subjected to heat treatment.

6. The R—Fe—B-based sintered magnet with the low B content according to claim 1, wherein:

the R—Fe—B-based sintered magnet is prepared according to a method comprising:

preparing a molten raw material component liquid of the R—Fe—B-based sintered magnet at a cooling rate of $10^{2}$° C./sec-$10^{4}$° C./sec into a quenched alloy;

crushing the quenched alloy by alloy hydrogen absorption;

micro-pulverizing the crushed quenched alloy into a fine powder;

acquiring a formed body using a magnetic field forming method or by hot-pressing thermal deformation;

sintering the formed body in a vacuum or inert gas at a temperature of 900° C.-1100° C.; and performing a heat treatment on the sintered formed body to acquire a product.

7. A method for preparing an R—Fe—B-based sintered magnet with a low B content, containing an $R_2Fe_{14}B$-type main phase, the R being at least one rare earth element comprising Nd, wherein:

the R—Fe—B-based sintered magnet comprises the following components:

28.5 wt %-31.5 wt % of R, 0.86 wt %-0.94 wt % of B, 0.2 wt %-1 wt % of Co, 0.2 wt %-0.45 wt % of Cu, 0.3 wt %-0.5 wt % of Ga, 0.02 wt %-0.2 wt % of Ti, and 61 wt %-69.5 wt % of Fe, the content of each of Dy, Tb, Gd, or Ho in R is 1 wt % or below, and the method comprises:

preparing a molten raw material component liquid of the R—Fe—B-based sintered magnet at a cooling rate of $10^{2}$° C./sec-$10^{4}$° C./sec into an alloy for the R—Fe—B-based sintered magnet;

crushing the alloy by alloy hydrogen absorption;

micro-pulverizing the crushed alloy into a fine powder;

acquiring a formed body using a magnetic field forming method;

sintering the formed body in a vacuum or inert gas at a temperature of 900° C.-1100° C.; and performing a heat treatment on the sintered formed body to acquire a product.

8. The R—Fe—B-based sintered magnet with the low B content according to claim 2, wherein:

the R—Fe—B-based sintered magnet is prepared according to a method comprising:

preparing a molten raw material component liquid of the R—Fe—B-based sintered magnet at a cooling rate of $10^{2}$° C./sec-$10^{4}$° C./sec into a quenched alloy;

crushing the quenched alloy by alloy hydrogen absorption;

micro-pulverizing the crushed quenched alloy into a fine powder;

acquiring a formed body using a magnetic field forming method or by hot-pressing thermal deformation;

sintering the formed body in a vacuum or inert gas at a temperature of 900° C.-1100° C.; and performing a heat treatment on the sintered formed body to acquire a product.

* * * * *